US008924926B1

(12) United States Patent
Fraser

(10) Patent No.: US 8,924,926 B1
(45) Date of Patent: Dec. 30, 2014

(54) TECHNIQUES FOR DISAMBIGUATING UNCONNECTED COMPONENTS IN A VISUAL PROGRAMMING INTERFACE

(71) Applicant: Google Inc., Mountain View, CA (US)

(72) Inventor: Neil Donald Fraser, San Francisco, CA (US)

(73) Assignee: Google Inc., Mountain View, CA (US)

( * ) Notice: Subject to any disclaimer, the term of this patent is extended or adjusted under 35 U.S.C. 154(b) by 96 days.

(21) Appl. No.: 13/832,710

(22) Filed: Mar. 15, 2013

(51) Int. Cl.
*G06F 9/44* (2006.01)

(52) U.S. Cl.
CPC ..................................... *G06F 8/34* (2013.01)
USPC ............................ 717/113; 717/105; 717/109

(58) Field of Classification Search
CPC ........................... G06F 8/30; G06F 8/33–8/34
USPC ........................................ 717/105, 109, 113
See application file for complete search history.

(56) References Cited

U.S. PATENT DOCUMENTS

| 5,557,731 | A | 9/1996 | Li et al. | |
| 8,539,367 | B2 * | 9/2013 | Dickey | 715/763 |
| 2002/0089541 | A1 * | 7/2002 | Orbanes et al. | 345/764 |
| 2006/0156282 | A1 * | 7/2006 | Mathew | 717/113 |

OTHER PUBLICATIONS

Cox et al., "Abstraction in Algorithm Animation," IEEE, 1992, 7pg.*
Kim et al., "Target Exploration for Disconnected Feasible Regions in Enterprise-Driven Multilevel Product Design," AIAA/ISSMO, 2005, 11pg.*
Smith, David N., "Visual Programming in the Interface Construction Set," IEEE, 1988, 12pg.*
Franck, G. et al., Layout and Structuring Object Oriented Software in Three Dimensions, CASCON '95 Proceedings of the 1995 Conference of the Centre for Advanced Studies on Collaborative Research, 1995, 10 pages.
Giffen et al., A Visual Programming Interface for Smalltalk, Proceedings Technology of Object-Oriented Languages and Systems, 1997, pp. 260-269.
Quilici, A. et al., DECODE: A Cooperative Environment for Reverse-Engineering Legacy Software, Proceedings of 2nd Working Conference on Reverse Engineering, 1995, pp. 156-165.

* cited by examiner

*Primary Examiner* — Ryan Coyer
(74) *Attorney, Agent, or Firm* — Remarck Law Group PLC

(57) ABSTRACT

Computer-implemented techniques for disambiguating unconnected visual pieces in a visual programming interface (VPI) that allows a user to manipulate visual pieces to generate computer code are disclosed. The techniques include generating the VPI, receiving a command to move a selected visual piece to a requested location in the VPI, and adjusting the position of the selected visual piece to the requested location. The techniques include determining whether the selected visual piece is connected to a proximate visual piece. When the two visual pieces are not connected, the techniques include i) determining a distance between the two visual pieces, ii) comparing the distance to a distance threshold, and iii) when the distance is not greater than the distance threshold, adjusting the position of the selected visual piece and/or the proximate visual piece such that the distance between the two visual pieces is greater than the predetermined distance threshold.

20 Claims, 6 Drawing Sheets

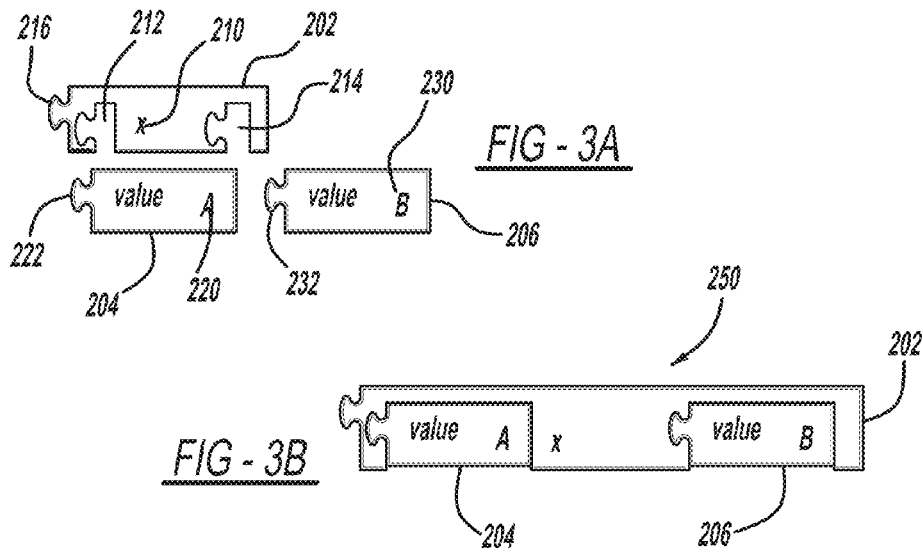
FIG - 3A
FIG - 3B
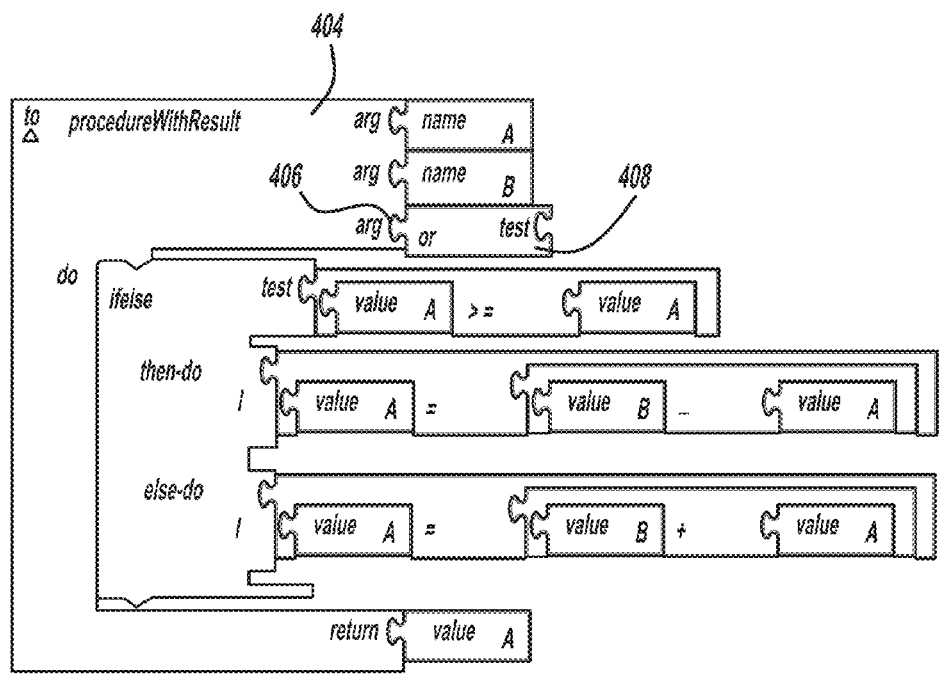
FIG - 4A

TECHNIQUES FOR DISAMBIGUATING UNCONNECTED COMPONENTS IN A VISUAL PROGRAMMING INTERFACE

FIELD

The present disclosure relates to techniques for disambiguating unconnected visual pieces in a visual programming interface.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Visual programming languages are programming languages that allow programmers to generate computer programs using graphical elements, as opposed to generating code textually. A programmer can generate the computer program using a visual programming interface. Some visual programming interfaces allow the programmer to connect graphical elements with one another to generate expressions, statements, routines, functions, or the like. For example, a programmer may connect an operator, e.g., a plus operator, with two operands, e.g., two integers, to create a mathematical expression. As can be appreciated, the programmer can create increasingly complex computer code, which can be compiled into an executable program.

SUMMARY

In various embodiments, a computer-implemented method for generating, at a computing device having one or more processors, a visual programming interface is disclosed. The visual programming interface can be displayed at a user device and allow a user to manipulate a plurality of visual pieces that represent computer instructions to generate computer code. A connection between visual pieces in the visual programming interface can represent a relationship between corresponding computer instructions in the generated computer code. Each visual piece can include at least one connector and visual pieces may be connected when their corresponding connectors are aligned and their corresponding computer instructions are logically compatible. The method can further include receiving user input indicating a command to move a selected visual piece to a requested location in the visual programming interface.

A distance table can also be generated at the computing device. The distance table can store locations of one or more other visual pieces with respect to the selected visual piece in the visual programming interface. The distance table can be indexed by one of (i) X-coordinates of the other visual pieces with respect to the selected visual piece and (ii) Y-coordinates of the other visual pieces with respect to the selected visual piece. The method can further include storing the other one of the (i) X-coordinates of the other visual pieces with respect to the selected visual piece and (ii) Y-coordinates of the other visual pieces with respect to the selected visual piece, wherein the one or more other visual pieces include the proximate visual piece.

Additionally, the method can determine whether the selected visual piece is connected to a proximate visual piece based on the distance table. When the selected visual piece is not connected to the proximate visual piece, the method can include determining a distance between the selected visual piece and the proximate visual piece. When the distance is not greater than a predetermined distance threshold, the method can further adjust a position of the selected visual piece or the proximate visual piece such that the distance is greater than the predetermined distance threshold.

In further embodiments, another computer-implemented method for generating, at a computing device having one or more processors, a visual programming interface is disclosed. The visual programming interface can be displayed at a user device and allow a user to manipulate a plurality of visual pieces that represent computer instructions to generate computer code. A connection between visual pieces in the visual programming interface can represent a relationship between corresponding computer instructions in the generated computer code. The method can also include receiving user input indicating a command to move a selected visual piece to a requested location in the visual programming interface, and determining whether the selected visual piece is connected to a proximate visual piece at the requested location. Additionally, when the selected visual piece is not connected to the proximate visual piece, the method can include determining a distance between the selected visual piece at the requested location and the proximate visual piece. When the distance is not greater than a predetermined distance threshold, the method can include adjusting a position of the selected visual piece or the proximate visual piece such that the distance is greater than the predetermined distance threshold.

According to various embodiments of the present disclosure, the method can further include generating one or more data structures, each individual data structure representing a set of interconnected visual pieces, wherein each interconnected visual piece in the set of interconnected visual pieces is connected to at least one other visual piece represented in the individual data structure.

Additionally or alternatively, the selected visual piece can be determined to be connected to the proximate visual piece when the selected visual piece and the proximate visual piece are members of a same data structure of the one or more data structures.

The method can further include, in some embodiments, generating a distance table storing locations of one or more other visual pieces with respect to the selected visual piece in the visual programming interface, the distance table being indexed by one of (i) X-coordinates of the other visual pieces with respect to the selected visual piece and (ii) Y-coordinates of the other visual pieces with respect to the selected visual piece, and storing the other one of the (i) X-coordinates of the other visual pieces with respect to the selected visual piece and (ii) Y-coordinates of the other visual pieces with respect to the selected visual piece, wherein the one or more other visual pieces include the proximate visual piece. Additionally, the method can include determining whether the proximate visual piece is within the predetermined distance based on the distance table.

The plurality of visual pieces can each include at least one connector, wherein visual pieces are connected when their corresponding connectors are aligned and their corresponding computer instructions are logically compatible. Further, adjusting the position of the selected visual piece or the position of the proximate visual piece can be in a predetermined direction and by a predetermined distance.

In various embodiments, the method can further include, upon adjusting the position of the selected visual piece or the proximate visual piece determining whether one of the selected visual piece and the proximate visual piece is connected to a different proximate visual piece. When the one of the selected visual piece and the proximate visual piece is not connected to the different proximate visual piece, the method can include determining a new distance between the one of the selected visual piece and the proximate visual piece and the different proximate visual piece. When the new distance is not greater than the predetermined distance threshold, the method can further include adjusting a position of the different proximate visual piece such that the new distance is greater than the predetermined distance threshold.

In some embodiments, the position of the selected visual piece is only adjusted no more than twice and the position of the proximate visual piece is adjusted no more than once. Additionally or alternatively, the computer instructions can include one or more of a declaration of a variable, an assignment of a value to the variable, a mathematical operation performed on one or more operands, an input instruction, an output instruction, a logic instruction, and a control instruction.

According to various embodiments of the present disclosure, a computer-implemented system is disclosed. The system can include a user interface module. The user interface module can generate a visual programming interface that is displayed at a user device. The visual programming interface can allow a user to manipulate a plurality of visual pieces that represent computer instructions to generate computer code, where a connection between visual pieces represents a relationship between corresponding computer instructions in the generated computer-code. The user interface module can further receive user input indicating a command to move a selected visual piece to a requested location in the visual programming interface.

The system can further include an ambiguity determination module that determines whether the selected visual piece is connected to a proximate visual piece at the requested location. When the selected visual piece is not connected to the proximate visual piece, the ambiguity determination module can determine a distance between the selected visual piece at the requested location and the proximate visual piece. When the distance is not greater than a predetermined distance threshold, ambiguity determination module can adjust a position of the selected visual piece or the proximate visual piece such that the distance is greater than the predetermined distance threshold.

The system can further include a data structure generation module that generates one or more data structures. Each individual data structure can represent a set of interconnected visual pieces, wherein each interconnected visual piece in the set of interconnected visual pieces is connected to at least one other visual piece represented in the individual data structure. In some embodiments, the ambiguity determination module can determine that the selected visual piece is connected to the proximate visual piece when the selected visual piece and the proximate visual piece are members of a same data structure of the one or more data structures.

The system can further include a distance determination module that generates a distance table storing locations of one or more other visual pieces with respect to the selected visual piece in the visual programming interface. The distance table can be indexed by one of (i) X-coordinates of the other visual pieces with respect to the selected visual piece and (ii) Y-coordinates of the other visual pieces with respect to the selected visual piece. The distance determination module can also store the other one of the (i) X-coordinates of the other visual pieces with respect to the selected visual piece and (ii) Y-coordinates of the other visual pieces with respect to the selected visual piece, wherein the one or more other visual pieces include the proximate visual piece. The ambiguity determination module can determine whether the proximate visual piece is within the predetermined distance based on the distance table.

According to various embodiments of the present disclosure, the plurality of visual pieces can each include at least one connector, wherein visual pieces are connected when their corresponding connectors are and their corresponding computer instructions are logically compatible.

Additionally or alternatively, the ambiguity determination module can adjust the position of the selected visual piece or the position of the proximate visual piece in a predetermined direction and by a predetermined distance. Upon adjusting the position of the selected visual piece or the position of the proximate visual piece, the ambiguity determination module can determine whether one of the selected visual piece and the proximate visual piece is connected to a different proximate visual piece. When the one of the selected visual piece and the proximate visual piece is not connected to the different proximate visual piece, the ambiguity determination module can determine a new distance between the one of the selected visual piece and the proximate visual piece and the different proximate visual piece. When the new distance is not greater than the predetermined distance threshold, the ambiguity determination module can, adjust a position of the selected visual piece or the proximate visual piece such that the distance is greater than the predetermined distance threshold.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 3A and 3B are drawings illustrating examples of visual pieces and connecting visual pieces according to some embodiments of the present disclosure;

FIGS. 4A and 4B are drawings illustrating examples of an ambiguity between two visual pieces and disambiguating the two visual pieces causing the ambiguity, respectively, according to some embodiments of the present disclosure;

DETAILED DESCRIPTION

Figure 1A:
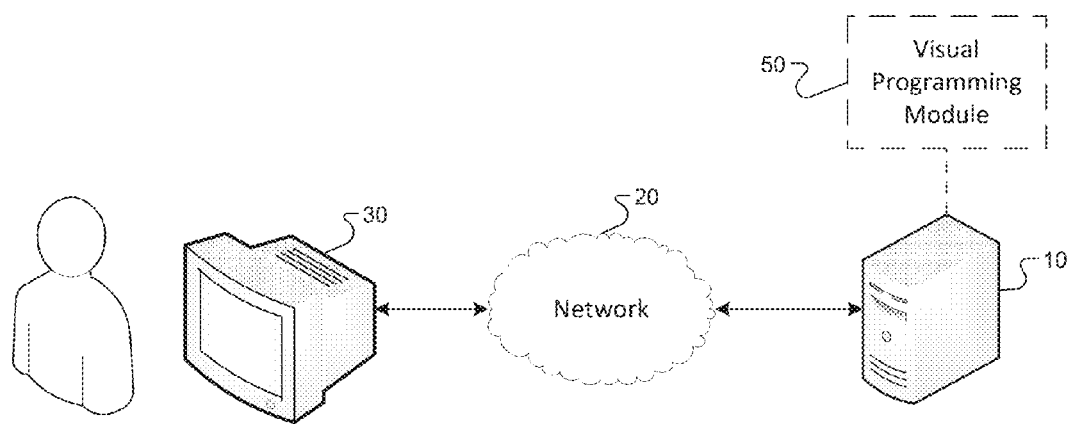
FIGS. 1A and 1B are drawings illustrating example environments for providing a visual programming interface according to some embodiments of the present disclosure.
Figure 1B:
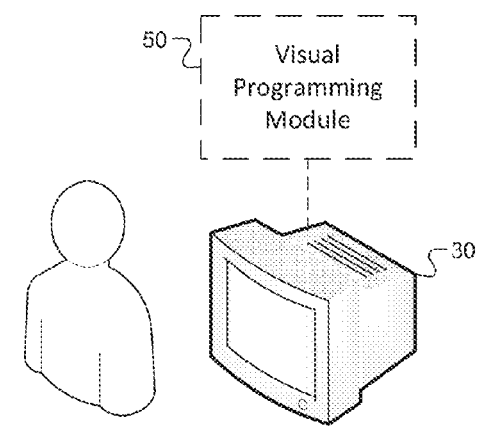

FIGS. 1A and 1B illustrate example environments for presenting a visual programming interface (VPI) to a user. A VPI can be a graphical user interface (GUI) that allows a user, e.g., a programmer, to generate computer code using a plurality of visual pieces, which are described in greater detail below. In FIG. 1A, the VPI can be generated by a visual programming module 50 that is implemented at one or more servers 10. The server 10 can generate the VPI and transmit it over a network 20 for display at a user device 30. In the illustrated example, the server 10 may execute computer-executable instructions for generating and manipulating the VPI and provide the VPI to the user device 30 for display. In some embodiments, the server 10 may provide the computer-executable instructions to the user device 30, which in turn executes the computer-executable instructions. It should be appreciated that the server 10 can include one or more processors, and in some embodiments, a plurality of distributed servers 10 can generate the VPI. In FIG. 1B, the visual programming module 50 is implemented at the user device 30, which executes computer-executable instructions for generating and manipulating the VPI.

Figure 2:
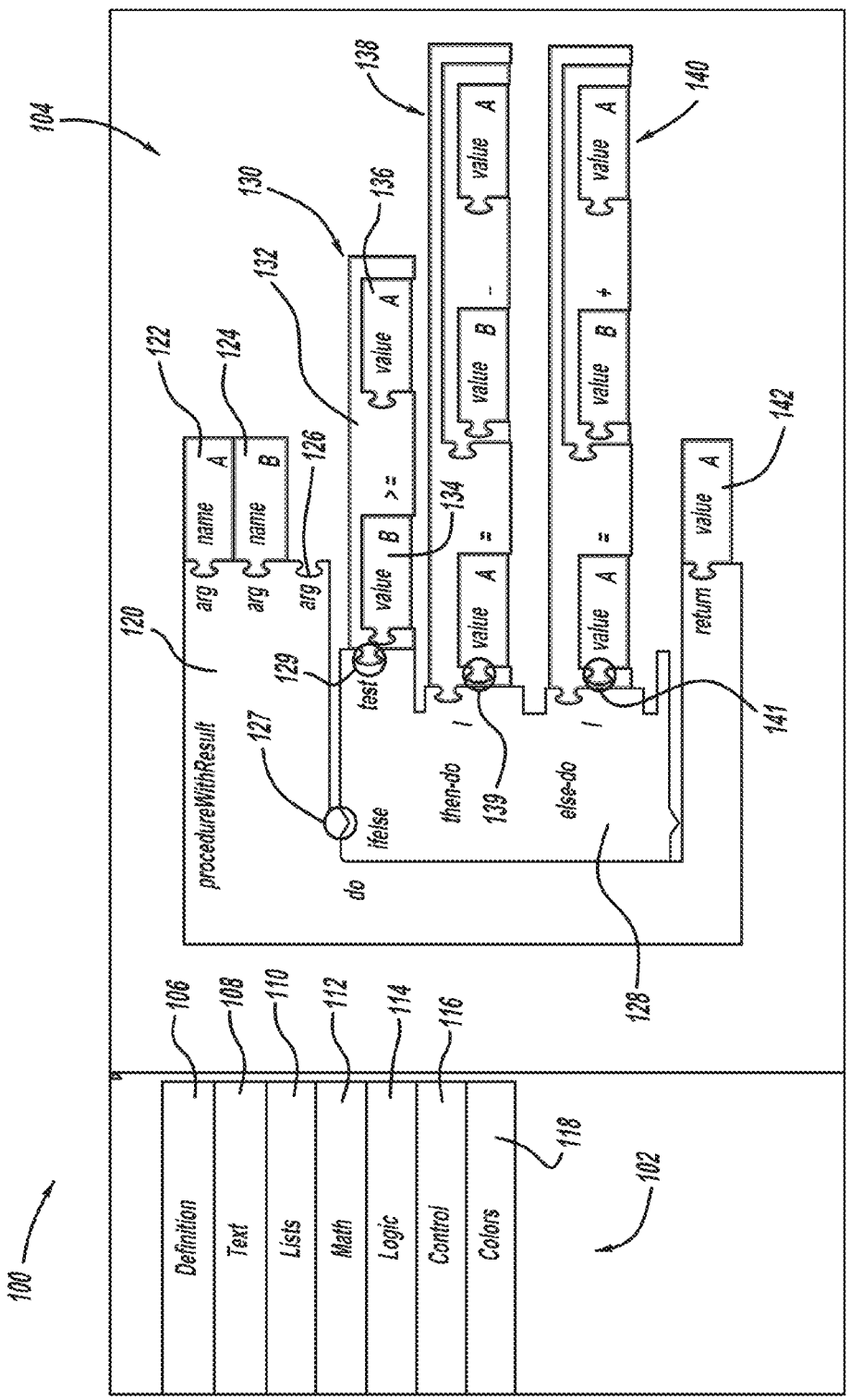
FIG. 2 is a drawing illustrating an example of a visual programming interface according to some embodiments of the present disclosure.

Referring now to FIG. 2, an example of a visual programming interface 100 (VPI) is illustrated. The example VPI 100 may include a menu area 102 and a programming area 104. It should be appreciated that the VPI 100 is provided for example only and not intended to limit the scope of the disclosure.

The programming area 104 is the portion of the VPI 100 where a user can position visual pieces in relation to other visual pieces to create computer code. A visual piece can be a graphical element that represents a computer instruction. A computer instruction can be any instruction that can be compiled and executed by a processor. For example, an instruction can be a declaration of a variable, an assignment of a value to a variable, a mathematical operation performed on one or more operands, an input instruction, an output instruction, a logic instruction such as an if-else instruction or a do-while instruction, a control instruction such as a function declaration, or any other type of instruction. The user can connect two or more visual pieces, such that a connection indicates a relationship between the instructions represented by the two or more visual pieces. The resulting relationship may be an expression which returns a value or a statement which does not return a value.

In the illustrated example, the user has generated a function using a plurality of visual pieces. At the highest level, the user has included a procedure visual piece 120. The procedure visual piece 120 can receive zero or more arguments. The user can define the arguments by connecting one or more visual pieces to the procedure visual piece 120. In the example, the user has connected a first argument visual piece 122 referencing a variable "A" and a second argument visual piece 124 referencing a variable "B" to the procedure visual piece 120. If the user desires, the user can connect an additional argument visual piece to the procedure visual piece 120 at a connector 126. The procedure visual piece 120 can also have a variable visual piece 142 indicating a value that is returned after the procedure is performed.

In the body of the procedure, the user has connected a logic visual piece 128 to the procedure visual piece 120 at connection point 127. The logic visual piece 128 in the illustrated example is an "if-else" statement. The user has connected a test expression 130 to the logic visual piece 128 at connection point 129. In the illustrated example, the test expression 130 is whether the value of the variable B is greater than or equal to the value of the variable A. The test expression 130 is made up of a mathematical operator visual piece 132 indicating the "greater than" operator, a first mathematical operand visual piece 134 indicating the value of the variable B, and a second mathematical operand visual piece 136 indicating the value of the variable A.

If the test expression 130 is true, then a first mathematical expression 138 is performed, e.g. "A=B−A." The first mathematical expression 138 is connected to the logic visual piece 128 at connection point 139. As should be appreciated, the first mathematical expression 138 is formed by five visual pieces. If the test expression 130 is false, then a second mathematical expression 140 is performed, e.g., "A=B+A." The second mathematical expression 140 is connected to the logic visual piece 128 at connection point 141. As should be appreciated, the second mathematical expression 140 is formed by five visual pieces as well.

In the illustrated example, the menu area 102 includes drop down menus for selecting different types of visual pieces. For example, the menu area may include a "definition" drop down menu 106 for selecting definition visual pieces, a "text" drop down menu 108 for selecting text visual pieces, a "lists" drop down menu 110 for selecting list visual pieces, a "math" drop down menu 112 for selecting mathematical visual pieces, a "logic" drop down menu 114 for selecting logic visual pieces, a "control" drop down menu 116 for selecting control visual pieces, and a "colors" drop down menu 118 for selecting color visual pieces. The user can chose a type of visual piece from one of the drop down menus. For example, the user may choose a mathematical visual piece representing the "+" operand from the math drop down menu 112. In some embodiments, the chosen visual piece is then displayed in the programming area 104 of the VPI 100. Once displayed in the programming area 104, the user can incorporate the newly chosen visual piece into the computer code being generated.

Referring now to FIGS. 3A and 3B, examples of visual pieces, e.g. visual piece 202, visual piece 204, and visual piece 206, are depicted. In the example of FIGS. 3A and 3B, the visual pieces are mathematical visual pieces and include an operator visual piece 202, a first operand visual piece 204, and a second operand visual piece 206. It should be appreciated that the visual pieces described herein are provided for example only, and the description contained herein is applicable to other types of visual pieces, not only mathematical visual pieces.

The operator visual piece 202 can include an instruction type 210. In the illustrated example, the instruction type 210 indicates that the operator visual piece 202 is for a multiplication instruction. The operator visual piece 202 further includes three connectors 212, 214, and 216. In some embodiments, the connectors can further be classified as male connectors, e.g., connector 216, and female connectors, e.g., connectors 212 and 214. As should be appreciated, a female connector of a visual piece receives a male connector of another visual piece.

The first operand visual piece 204 can include an instruction type 220. In this example, the instruction type is a value of the variable "A." The first operand visual piece 204 can also include a connector 222. In this example, the connector 222 is a male connector 222. Similarly, the second operand visual piece 206 includes an instruction type 230 and a male connector 232.

FIG. 3B illustrates an example of an expression 250. In the example, the male connector 222 (FIG. 3A) of the first operand visual piece 204 has been inserted into the female connector 212 (FIG. 3A) of the operator visual piece 202 and the male connector 232 of the second operand visual piece 206 has been inserted into the female connector 214. As should be appreciated, the mathematical expression 250 is "A*B." The mathematical expression 250 can be included as part of a more complex expression by inserting the male connector 216 (FIG. 3A) of the operator visual piece 202 into a female connector of another visual piece (Not Shown).

In general, the user can generate computer code by selecting a visual piece and providing a command to move the selected visual piece to a requested location in the programming area 104 of the VPI 100. For example, the user can click on a selected visual piece and drag the selected visual piece to a requested location in the programming area 104. The user can connect a plurality of visual pieces to create expressions and/or statements, which in turn can be further connected to create more complex expressions and/or statements. It should be appreciated, that the user can create routines, subroutines, programs, and the like using the VPI 100. Once finished, the user can instruct a compiler associated with the visual programming module 50 to compile the generated computer code into computer-executable instructions that are executable by a processor. It is appreciated that the compiler can be implemented in any suitable manner.

One situation that may arise is when the user moves a selected visual piece into the proximity of a proximate visual piece, and for whatever reason, a connection is not formed between the selected visual piece and the proximate visual piece. These situations may arise, for example, when the selected visual piece and the proximate visual piece are not compatible instructions or when the connectors of the selected visual piece and the proximate visual piece are close enough to one another to appear connected, but no connection has been made between the two visual pieces. The situations described above may be referred to as ambiguities, as the user may believe that the two visual pieces are connected when the two visual pieces are not actually connected. In these situations, the computer code that is generated from the collection of visual pieces may not compile as the user desired, as the user may be believe that a connection exists where no such connection has been made.

FIG. 4A illustrates an example of an ambiguity. In the example, the user has attempted to connect a selected visual piece 408 to a complex expression 400 at a female connector 406 of a proximate visual piece 404. In the example, the proximate visual piece 404 is a control visual piece for a procedure that can receive arguments. Thus, in order to connect to proximate visual piece 404 at connector 406, the user should provide a visual piece which represents a variable, e.g., an integer, character, string or the like. In the example, however, the selected visual piece 408 is a logic visual piece indicating an "OR" test. As should be appreciated, an "OR" test is not a valid argument for a procedure. While the selected visual piece 408 and the proximate visual piece 404 appear to be connected, no connection has been established between the selected visual piece 408 and the proximate visual piece 404.

Figure 4B:
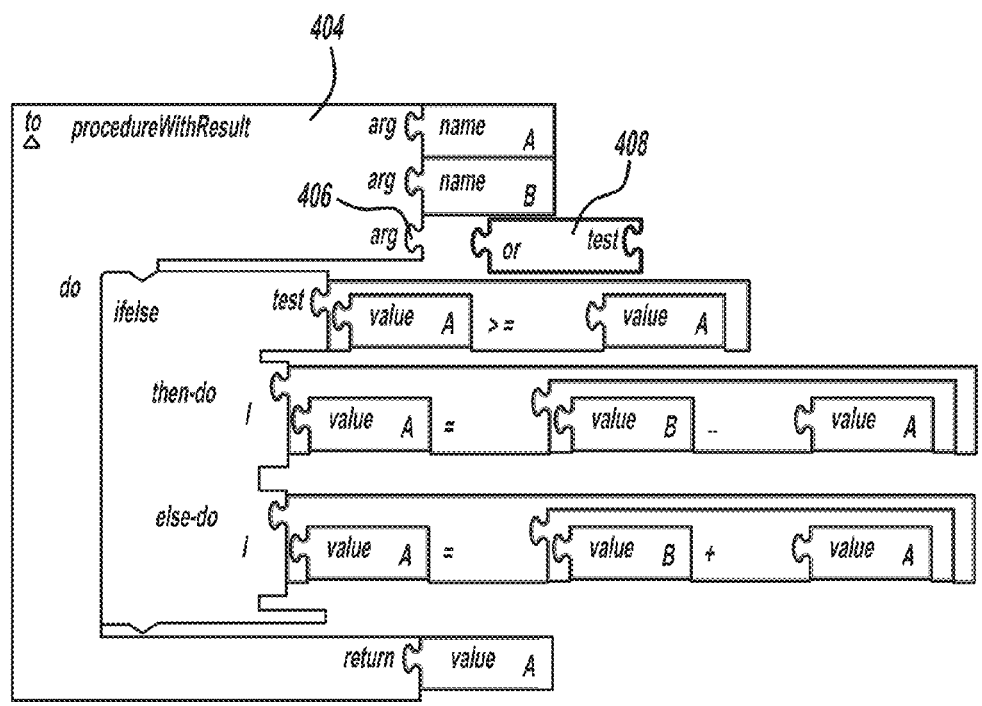

The visual programming module 50 can be configured to disambiguate unconnected visual pieces. FIG. 4B illustrates an example of the VPI 100 after the visual programming module 50 has disambiguated the selected visual piece 408 and the proximate visual piece 404. In some embodiments, the visual programming module 50 can disambiguate two unconnected visual pieces by adjusting the position of at least one of the visual pieces such that the visual pieces no longer appear to be connected. As should be appreciated, in FIG. 4B the selected visual piece 408 has been moved to the right, thereby disambiguating the selected visual piece 408 and the proximate visual piece 404. The example of FIGS. 4A and 4B is provided for example only and is not intended to limit the scope of the disclosure.

Figure 5:
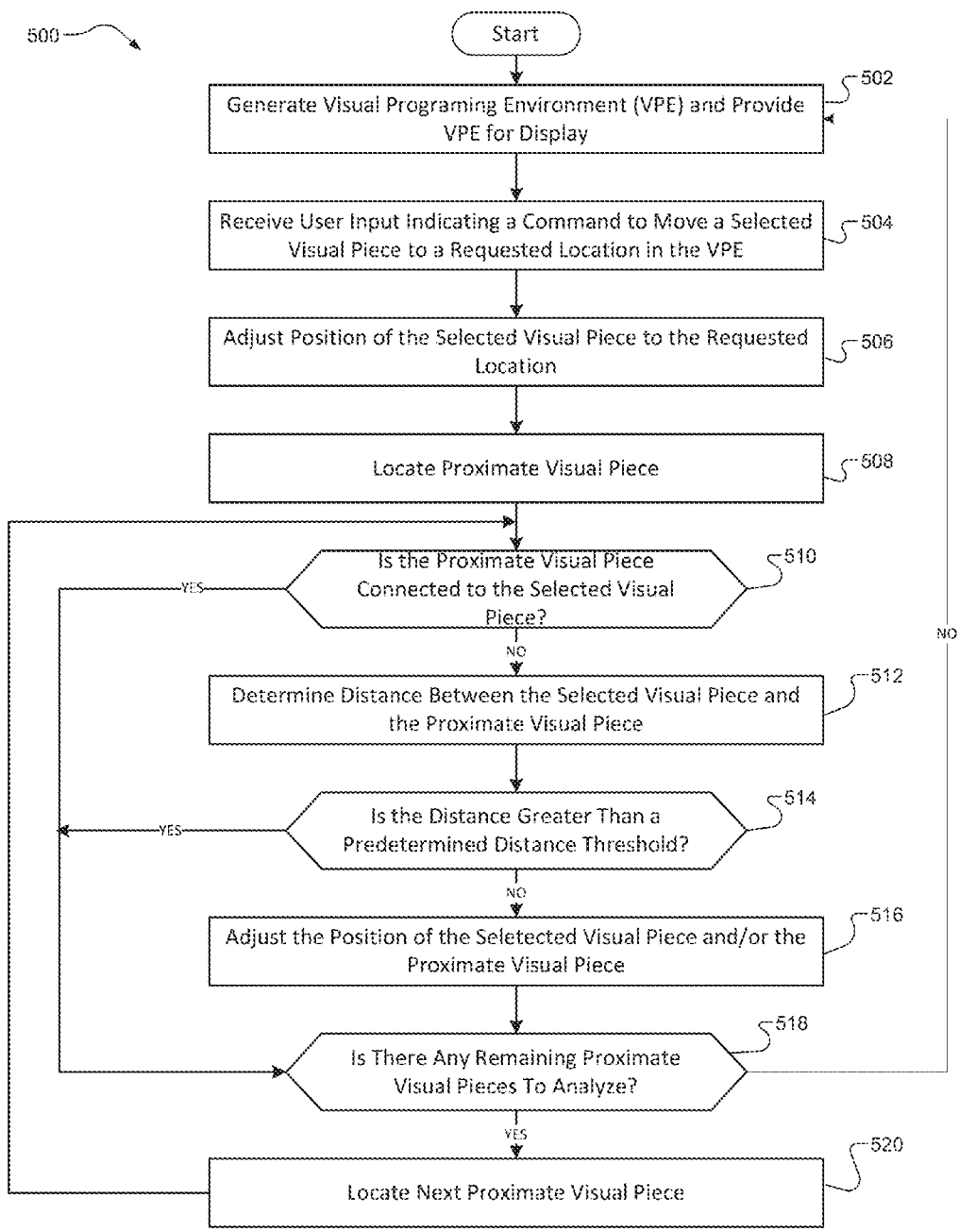
FIG. 5 is a flow chart illustrating an example technique for identifying an ambiguity in a visual programming interface and disambiguating the two visual pieces causing the ambiguity according to some embodiments of the present disclosure.

FIG. 5 illustrates an example technique for identifying unconnected visual pieces, and disambiguating the unconnected visual pieces. At 502, the VPI 100 is generated and provided for display at a user device 30. At 504, user input indicating a command to move a selected visual piece to a requested location in the VPI 100 can be received by the visual programming module 50. The command to move the selected visual piece may be, for example, received when a user clicks and drags on the selected visual piece. The location at which the user releases the selected visual piece can be identified as the requested location. At 506, the position of the selected visual piece is adjusted, such that the selected visual piece is located at the requested location in the VPI 100.

At 508, the visual programming module 50 can locate a proximate visual piece. It should be appreciated that the proximate visual piece can be any visual piece displayed in the VPI 100, or can be any visual piece within a predetermined distance from the selected visual piece. At 510, the visual programming module 50 can determine whether the proximate visual piece is connected to the selected visual piece. The visual programming module 50 can make this determination in any suitable manner. For instance, the visual programming module 50 can be configured to generate data structures for each set of interconnected visual pieces, such that each interconnected visual piece in the set is connected to at least one other interconnected visual piece in the set. The visual programming module 50 can determine that the selected visual piece and the proximate visual piece are connected if both visual pieces are in the same data structure. When the selected visual piece and the proximate visual piece are connected, the visual programming module 50 can determine whether there are any remaining proximate visual pieces to analyze, as shown at 518, which is described in greater detail below. If the selected visual piece and the proximate visual piece are not in the same data structure, then the visual programming module 50 can determine that the selected visual piece and the proximate visual piece are not connected.

In some embodiments, the data structure is a hierarchical tree, where the highest level instruction is the root node of the hierarchical tree, visual pieces that are connected to the highest level instructions are children of the root node, and so on and so forth. For instance, in the example of FIG. 2, the procedure visual piece 120 would be the root node in the hierarchical tree, while the visual pieces 122, 124, 128 and 142, are the children nodes. Visual piece 132 would be a child node of logic visual piece 128 and a grandchild node of visual piece 120. While a hierarchical tree is described, it should be appreciated that other suitable data structures may be implemented. For example, a linked list can represent a set of interconnected visual pieces.

When the selected visual piece and the proximate visual piece are not connected, the visual programming module 50 can determine a distance between the selected visual piece and the proximate visual piece, as shown at 512. The distance between two visual pieces can represent an amount of units between two visual pieces, when measured from a particular resolution. As should be appreciated, at different resolutions, the selected visual piece and the proximate visual piece may appear closer or further apart. Thus, the distance between the two visual pieces may be based on the resolution that the visual pieces are currently being viewed at by the user, such that the greater the resolution, e.g., the greater amount of "zoom," the larger the unit.

The distance between two visual pieces can be determined in any suitable manner. For example, in embodiments where the visual pieces include connectors, the distance can be calculated from a first point corresponding to a connector of the selected visual piece to a second point corresponding to a connector of the proximate visual piece. Further, in some embodiments, a distance table can be generated for the selected visual piece and the visual programming module 50 can determine the distance from the distance table.

A distance table lists a position of one or more proximate visual pieces with respect to the selected visual piece. The distance table can be indexed by one of the X-coordinates of the proximate visual pieces or the Y-coordinates of the proximate visual pieces, such that if the selected visual piece is located at (0,0), the positions of the proximate visual pieces are represented with respect to the selected visual piece. For instance, if a specific proximate visual piece is located two units to the right and two units up from the selected visual piece, the specific proximate visual piece can be said to be located at (2,2). In embodiments where the distance table is referenced by X-coordinates, an entry corresponding to a particular proximate visual piece in the distance table may be indexed at the X-coordinate of the particular proximate visual piece, and may include a reference to the particular proximate visual piece and the Y-coordinate of the particular visual piece. For instance, in the example with the specific proximate visual piece located at (2,2) with respect to the selected visual piece, the specific proximate visual piece can be indexed at X=2, and the entry can include the Y-coordinate, e.g., 2, of the specific proximate visual piece. As should be appreciated, a distance can then be calculated, for example, by calculating the Euclidean distance between the selected visual piece and the proximate visual piece.

At 514, the visual programming module 50 can compare the distance between the selected visual piece and the proximate visual piece to a distance threshold. If the distance between the two visual pieces is greater than the distance threshold, then it is unlikely that there is an ambiguity as to the connectedness of the selected visual piece and the proximate visual piece. That is, the two visual pieces are not connected and do not appear to be connected. If, however, the distance is not greater than the distance threshold, then the selected visual piece and the proximate visual piece may appear connected when in fact the two visual pieces are not connected.

When an ambiguity between the selected visual piece and the proximate visual piece exists, the visual programming module 50 can disambiguate the selected visual piece and the proximate visual piece by adjusting the position of the selected visual piece and/or the proximate visual piece, as shown at 516. In some embodiments, the visual programming module 50 can adjust the position of the selected visual piece and/or the proximate visual piece such that the distance between the two visual pieces exceeds the distance threshold. It should be appreciated that when the position of the selected visual piece or the proximate visual piece is adjusted, the positions of any visual pieces connected to the selected visual piece or the proximate visual piece are also adjusted.

In some embodiments, the visual programming module 50 can be configured to adjust the position of the selected visual piece by moving the selected visual piece in a predetermined direction and a predetermined distance. For example, if the selected visual piece is to the right of the proximate visual piece, the visual programming module 50 can move the selected visual piece upward and further to the right by 2 units in each direction. Similarly, if the selected visual piece is to the left of the proximate visual piece, the selected visual piece can be moved downward and further to the left. It should be appreciated that the position of the proximate visual piece may also be adjusted in a similar manner.

Once the position of the selected visual piece and/or the proximate visual piece has been adjusted, the visual programming module 50 determines whether there are any other proximate visual pieces to analyze with respect to the selected visual piece, as shown at 518. If there are other proximate visual pieces to analyze, the visual programming module 50 identifies a next proximate visual piece, as shown at 520, and returns to 510. If there are no other proximate visual pieces remaining, then the visual programming module 50 can update the VPI 100 to indicate the new position of the selected visual piece and/or any proximate visual pieces that may have had their respective positions updated.

In some scenarios, a situation may arise where the selected visual piece is between two or more proximate visual pieces, the selected visual piece is determined to be not connected to any of the proximate visual pieces, and the selected visual piece is within the distance threshold from one of the proximate visual pieces. In such a scenario, the visual programming module 50 may enter an infinite loop if the position of the selected visual piece is toggled between the two or more proximate visual pieces. To avoid such situations, the visual programming module 50 can be configured to adjust the position of the selected visual piece no more than twice or any of the proximate visual pieces no more than once. If a new ambiguity arises, then the visual programming module 50 may be restricted to only moving a visual piece if the proximate visual piece has not been previously moved. If none of the visual pieces causing the ambiguity can be moved, then a visual indicator such as a warning may be presented to the user via the VPI 100.

Figure 6:
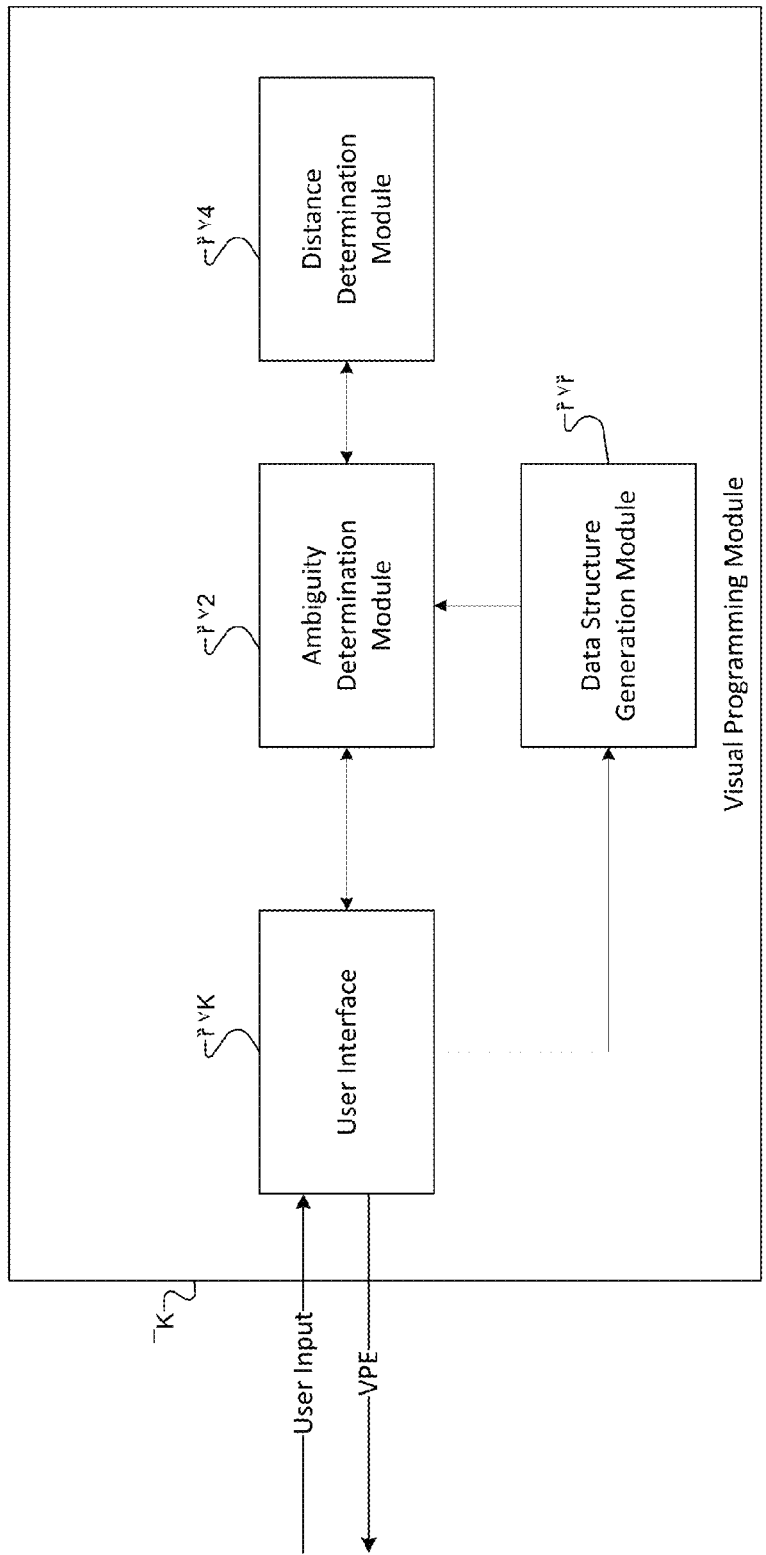
FIG. 6 is a block diagram illustrating example components of a visual programming module according to some embodiments of the present disclosure.

Referring now to FIG. 6, an example visual programming module 50 is depicted. The visual programming module 50 can include a user interface module 610, an ambiguity determination module 612, a distance determination module 614, and a data structure generation module 616.

The user interface module 610 can be configured to generate the VPI 100, which can be displayed at the user device 30. Furthermore, the user interface module 610 can be further configured to receive user commands. For example, the user interface module 610 can receive a user command to move a selected visual piece to a requested location in the programming area 104 of the VPI 100. Upon receiving such a user command, the user interface module 610 can adjust the position of the selected visual piece so that the selected visual piece is moved to the requested location in the programming area 104 of the VPI 100.

The user interface module 610 can receive other user commands as well. For example, the user interface module 610 may receive user commands indicating a type of visual piece that a user has chosen from the menu area 102. Upon receiving such a user command, the user interface module 610 may generate and display the chosen visual piece in the programming area 104.

The ambiguity determination module 612 analyzes the VPI 100 after a triggering event to determine if there are any ambiguities in the VPI 100. An example of a triggering event is when a user provides a user command to move a selected visual piece to a requested location. The ambiguity determination module 612 can analyze the VPI 100 to determine whether there is a visual piece that is not connected to another visual piece and is within a distance threshold from the other visual piece. For example, the ambiguity determination module 612 can determine if the selected visual piece is connected to a proximate visual piece. When the selected visual piece is not connected to the proximate visual piece, the ambiguity determination module 612 can determine whether the distance between the selected visual piece and the proximate visual piece is less than or equal to a distance threshold. When the distance is less than or equal to the distance threshold, e.g., an ambiguity has been determined, the ambiguity determination module 612 can adjust the position of the selected visual piece and/or a position of the proximate visual piece in the VPI 100, such that the distance between the selected visual piece and the proximate visual piece is greater than the predetermined distance threshold.

The data structure generation module 616 generates one or more data structures that can be used by the ambiguity determination module 612 to determine whether two visual pieces are connected. As indicated above, the data structure generation module 616 can generate, for example, a hierarchical tree based on the visual pieces displayed by the VPI 100 and the connections between the visual pieces. The data structure generation module 616 can generate the data structure in any suitable manner and provide the generated data structure to the ambiguity determination module 612.

As described above, the ambiguity determination module 612 can determine whether the selected visual piece and a proximate visual piece are connected by, for example, determining whether both visual pieces are included in the same data structure. If so, then the two visual pieces are connected. If the selected visual piece and the proximate visual piece are not in the same data structure, the two visual pieces are not connected. When the selected visual piece and the proximate visual piece are not connected, the ambiguity determination module 612 can determine whether there is an ambiguity between the selected visual piece and the proximate visual piece based on the distance between the selected visual piece and the proximate visual piece.

The distance determination module 614 can determine a distance between two visual pieces. It is appreciated that the distance determination module 614 can determine the distance in any suitable manner. For instance, the distance determination module 614 can calculate a Euclidean distance between a point on the selected visual piece and a point on a proximate visual piece. The distance determination module 614 can calculate a distance with the selected visual piece for every proximate visual piece displayed by the VPI 100 or only for relatively close proximate visual pieces.

In some embodiments, the distance determination module 614 can generate distance tables for one or more visual pieces, including the selected visual piece. As described above, a distance table with respect to the selected visual piece can be generated by indexing each proximate visual piece according to its location with respect to the selected visual piece. Once a distance table has been generated, the distance determination module 614 can determine a distance between the selected visual piece and a proximate visual piece indexed in the distance table based on the index of the proximate visual piece and the other coordinate corresponding to the proximate visual piece. For instance, if a proximate visual piece is indexed at X=3, and the Y-coordinate corresponding to the proximate visual piece is 4, then the distance determination module 614 can determine that the distance between the selected visual piece and the proximate visual piece is 5 units, e.g., $$\sqrt{(x_{proximate\_visual\_piece}^2 + y_{proximate\_visual\_piece}^2)}.$$

It should be appreciated that in the foregoing example, the x value can be obtained from the index, and the y value can be obtained from the entry corresponding to the index.

The distance determination module 614 can return the distance between the selected visual piece and the proximate visual piece to the ambiguity determination module 612. The ambiguity determination module 612 compares the distance between the selected visual piece and the proximate visual piece to a distance threshold. The distance threshold can be dependent on a current resolution or zoom of the VPI 100. For instance, if the amount of zoom is relatively high, then the distance threshold can be increased as well. When the distance is less than or equal to the distance threshold, then the ambiguity determination module 612 determines that an ambiguity exists.

When the ambiguity determination module 612 determines that an ambiguity exists, the ambiguity determination module 612 can disambiguate the selected visual piece and the proximate visual piece causing the ambiguity. For example, the ambiguity determination module 612 can adjust the position of the selected visual piece and/or the position of the proximate visual piece, such that the distance between the two visual pieces is greater than the distance threshold.

The ambiguity determination module 612 can analyze all of the visual pieces displayed in by the VPI 100 or can analyze visual pieces which the user has requested to be moved. The techniques described above have been provided for example only and are not intended to be limiting.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:

generating, at a computing device having one or more processors, a visual programming interface that is displayed at a user device, the visual programming interface allowing a user to manipulate a plurality of visual pieces that represent computer instructions to generate computer code, a connection between visual pieces representing a relationship between corresponding computer instructions in the generated computer code, each visual piece including at least one connector, wherein visual pieces are connected when their corresponding connectors are aligned and their corresponding computer instructions are logically compatible;

receiving, at the computing device, user input indicating a command to move a selected visual piece to a requested location in the visual programming interface;

generating, at the computing device, a distance table storing locations of one or more other visual pieces with respect to the selected visual piece in the visual programming interface, the distance table being indexed by one of (i) X-coordinates of the other visual pieces with respect to the selected visual piece and (ii) Y-coordinates of the other visual pieces with respect to the selected visual piece;

storing the other one of the (i) X-coordinates of the other visual pieces with respect to the selected visual piece and (ii) Y-coordinates of the other visual pieces with respect to the selected visual piece, wherein the one or more other visual pieces include the proximate visual piece;

determining, at the computing device, whether the selected visual piece is connected to a proximate visual piece based on the distance table;

when the selected visual piece is not connected to the proximate visual piece:
 i) determining a distance between the selected visual piece and the proximate visual piece, and
 ii) when the distance is not greater than a predetermined distance threshold, adjusting a position of the selected visual piece or the proximate visual piece such that the distance is greater than the predetermined distance threshold.

2. A computer-implemented method comprising:

generating, at a computing device having one or more processors, a visual programming interface that is displayed at a user device, the visual programming interface allowing a user to manipulate a plurality of visual pieces that represent computer instructions to generate computer code, a connection between visual pieces representing a relationship between corresponding computer instructions in the generated computer code;

receiving, at the computing device, user input indicating a command to move a selected visual piece to a requested location in the visual programming interface;

determining, at the computing device, whether the selected visual piece is connected to a proximate visual piece at the requested location;

when the selected visual piece is not connected to the proximate visual piece:
 i) determining a distance between the selected visual piece at the requested location and the proximate visual piece, and
 ii) when the distance is not greater than a predetermined distance threshold, adjusting a position of the selected visual piece or the proximate visual piece such that the distance is greater than the predetermined distance threshold.

3. The method of claim 2, further comprising generating one or more data structures, each individual data structure representing a set of interconnected visual pieces, wherein each interconnected visual piece in the set of interconnected visual pieces is connected to at least one other visual piece represented in the individual data structure.

4. The method of claim 3, wherein the selected visual piece is determined to be connected to the proximate visual piece when the selected visual piece and the proximate visual piece are members of a same data structure of the one or more data structures.

5. The method of claim 2, further comprising:

generating a distance table storing locations of one or more other visual pieces with respect to the selected visual piece in the visual programming interface, the distance table being indexed by one of (i) X-coordinates of the other visual pieces with respect to the selected visual piece and (ii) Y-coordinates of the other visual pieces with respect to the selected visual piece, and storing the other one of the (i) X-coordinates of the other visual pieces with respect to the selected visual piece and (ii) Y-coordinates of the other visual pieces with respect to the selected visual piece, wherein the one or more other visual pieces include the proximate visual piece.

6. The method of claim 5, further comprising determining whether the proximate visual piece is within the predetermined distance based on the distance table.

7. The method of claim 2, wherein the plurality of visual pieces each include at least one connector, wherein visual pieces are connected when their corresponding connectors are aligned and their corresponding computer instructions are logically compatible.

8. The method of claim 2, wherein adjusting the position of the selected visual piece or the position of the proximate visual piece is in a predetermined direction and by a predetermined distance.

9. The method of claim 8, further comprising:

upon adjusting the position of the selected visual piece or the proximate visual piece:
 i) determining whether one of the selected visual piece and the proximate visual piece is connected to a different proximate visual piece;
 ii) when the one of the selected visual piece and the proximate visual piece is not connected to the different proximate visual piece, determining a new distance between the one of the selected visual piece and the proximate visual piece and the different proximate visual piece; and
 iii) when the new distance is not greater than the predetermined distance threshold, adjusting a position of the different proximate visual piece such that the new distance is greater than the predetermined distance threshold.

10. The method of claim 2, wherein the position of the selected visual piece is only adjusted no more than twice and the position of the proximate visual piece is adjusted no more than once.

11. The method of claim 2 wherein the computer instructions include one or more of a declaration of a variable, an assignment of a value to the variable, a mathematical operation performed on one or more operands, an input instruction, an output instruction, a logic instruction, and a control instruction.

12. A computer-implemented system comprising:

a user interface module that:
 a) generates a visual programming interface that is displayed at a user device, the visual programming interface allowing a user to manipulate a plurality of visual pieces that represent computer instructions to generate computer code, a connection between visual pieces representing a relationship between corresponding computer instructions in the generated computer code, and
 b) receives user input indicating a command to move a selected visual piece to a requested location in the visual programming interface; and an ambiguity determination module that determines whether the selected visual piece is connected to a proximate visual piece at the requested location, and when the selected visual piece is not connected to the proximate visual piece:
 a) determines a distance between the selected visual piece at the requested location and the proximate visual piece, and
 b) when the distance is not greater than a predetermined distance threshold, adjusts a position of the selected visual piece or the proximate visual piece such that the distance is greater than the predetermined distance threshold.

13. The system of claim 12, a data structure generation module that generates one or more data structures, each individual data structure representing a set of interconnected visual pieces, wherein each interconnected visual piece in the set of interconnected visual pieces is connected to at least one other visual piece represented in the individual data structure.

14. The system of claim 13, wherein the ambiguity determination module determines that the selected visual piece is connected to the proximate visual piece when the selected visual piece and the proximate visual piece are members of a same data structure of the one or more data structures.

15. The system of claim 12, further comprising a distance determination module that:
   generates a distance table storing locations of one or more other visual pieces with respect to the selected visual piece in the visual programming interface, the distance table being indexed by one of (i) X-coordinates of the other visual pieces with respect to the selected visual piece and (ii) Y-coordinates of the other visual pieces with respect to the selected visual piece, and
   stores the other one of the (i) X-coordinates of the other visual pieces with respect to the selected visual piece and (ii) Y-coordinates of the other visual pieces with respect to the selected visual piece, wherein the one or more other visual pieces include the proximate visual piece.

16. The system of claim 15, wherein the ambiguity determination module determines whether the proximate visual piece is within the predetermined distance based on the distance table.

17. The system of claim 12, wherein the plurality of visual pieces each include at least one connector, wherein visual pieces are connected when their corresponding connectors are and their corresponding computer instructions are logically compatible.

18. The system of claim 12, wherein the ambiguity determination module adjusts the position of the selected visual piece or the position of the proximate visual piece in a predetermined direction and by a predetermined distance.

19. The system of claim 18, wherein upon adjusting the position of the selected visual piece or the position of the proximate visual piece, the ambiguity determination module:
   i) determines whether one of the selected visual piece and the proximate visual piece is connected to a different proximate visual piece;
   ii) when the one of the selected visual piece and the proximate visual piece is not connected to the different proximate visual piece, determines a new distance between the one of the selected visual piece and the proximate visual piece and the different proximate visual piece; and
   iii) when the new distance is not greater than the predetermined distance threshold, adjusts a position of the different proximate visual piece such that the new distance is greater than the predetermined distance threshold.

20. The system of claim 12, wherein the position of the selected visual piece is only adjusted no more than twice and the position of the proximate visual piece is adjusted no more than once.

* * * * *